United States Patent
Abe

[11] Patent Number: 6,094,258
[45] Date of Patent: Jul. 25, 2000

[54] OPTICAL RADAR APPARATUS

[75] Inventor: Shigekazu Abe, Tokyo, Japan

[73] Assignee: Mitsubishi Denki Kabushiki Kaisha, Tokyo, Japan

[21] Appl. No.: 09/085,457

[22] Filed: May 28, 1998

[30] Foreign Application Priority Data

Dec. 18, 1997  [JP]  Japan ................................. 9-349067

[51] Int. Cl.$^7$ ............................. G01C 3/08; G02B 27/00; G02B 15/14
[52] U.S. Cl. ........................ 356/4.01; 359/601; 359/614; 359/688
[58] Field of Search ................................. 356/4.01, 5.01, 356/5.1; 359/848, 601, 614

[56] References Cited

U.S. PATENT DOCUMENTS

| | | |
|---|---|---|
| 3,551,050 | 12/1970 | Thorlin . |
| 3,626,170 | 12/1971 | Schwan . |
| 3,781,111 | 12/1973 | Fletcher et al. . |
| 3,857,029 | 12/1974 | Krinke . |
| 5,699,150 | 12/1997 | Katayama ............................. 356/4.01 |

FOREIGN PATENT DOCUMENTS 8-5744  1/1996  Japan ............................. G01S 17/93

*Primary Examiner*—Stephen C. Buczinski
*Attorney, Agent, or Firm*—Sughrue, Mion, Zinn, Macpeak & Seas, PLLC

[57] ABSTRACT

An optical radar apparatus is provided with a light-emitting device 1 for emitting light and a fixed mirror 4 including a mirror for reflecting and transmitting the emitted light and a supporting member for supporting the mirror, wherein the mirror is fixed such that a reflecting surface of the mirror corresponds to an indent (drawn portion) provided in the supporting member so as to eliminate dispersion of the light due to distortion of the reflecting surface of the mirror. In addition, to eliminate internal reflection in the interior of the light-emitting device 1, the reflection of the light is suppressed by coloring the inner surfaces of the light-emitting device 1, for instance, in black or in a color for absorbing the light, or by attaching a woolen cloth thereto.

9 Claims, 9 Drawing Sheets

LIGHT BEAM 25
4a
4b 25
4a
4b

LIGHT BEAM
26
4c
4d

26 ically to a radar apparatus for a
OPTICAL RADAR APPARATUS

BACKGROUND OF THE INVENTION

The present invention relates to an optical radar apparatus in which light is emitted from a light-emitting device and is transmitted forward, and more particularly to an optical radar apparatus in which horizontal scanning is effected with emitted light, and reflected light from an object to be measured is received to detect the distance to and the direction of the object to be measured.

FIG. 7 is a schematic diagram illustrating a light-emitting device used in a conventional optical radar apparatus for a vehicle. A light-emitting device 110 shown in FIG. 7 has a laser diode (LD) 32 mounted for emitting a laser beam, and a semiconductor light-emitting element (LD chip) 32 and a base (stay) 33 for holding the semiconductor light-emitting element 32 are accommodated in a laser holder 31. In addition, a cover glass 34 for sealing the interior of the laser holder 31 is provided at the front surface, as viewed in the light-emitting direction, of the semiconductor light-emitting element 32.

Further, a lens 3 is provided in front, as viewed in the light-emitting direction, of the semiconductor light-emitting element 32, and this lens 3 performs the function of adjusting the laser light to a predetermined broadening angle. Component of the light transmission system such as the light-emitting device 110 and the lens 3 are mounted and held on a main board 14 by means of a lens holder 2.

FIG. 8 is a perspective view illustrating a fixed-mirror assembly 40 which performs the function of reflecting a light beam from the light-emitting device 110 and changing its direction, and this fixed-mirror assembly 40 is comprised of a mirror 21 and a supporting member 22 for supporting the mirror 21.

FIG. 9 is a diagram of the positional relationship illustrating the light transmitting direction of the light beam from the light-emitting device 110. In the drawing, the light beam emitted from the light-emitting device 110 is transmitted to a light-transmitting mirror 5 via the fixed mirror assembly 40. Then, the light beam reflected by the fixed mirror assembly 40 undergoes a change in its direction by the light-transmitting mirror 5, and is radiated in the forward direction.

The light-emitting device and the light transmission system used in the conventional optical radar apparatus are arranged as described above, and have problems which are described below.

First, in the fixed-mirror assembly 40 shown in FIG. 8, the supporting member 22 for supporting the mirror 21 has a shape in which a plate is bent into an L-shape. Namely, the overall surface for attaching the mirror 21 has a planar shape, and deflection is liable to occur in that portion. If the mirror 21 is attached in that state, the mirror 21 also becomes deflected along the deflection of the mirror 21. As a result, the light beam formed in to a predetermined beam shape by means of the lens 3 is reflected by the mirror 21 having the deflected reflecting surface, and is radiated in a dispersed manner as in the directions shown by the broken lines in FIG. 9.

In addition, with the conventional optical radar apparatus, the laser diode is widely used as the light-emitting means as shown in FIG. 7, but the material of the stay 33 and the holder 31 is generally a metal, and the inner peripheral surface and the bottom surface of the holder 31 are provided with gold plating or the like. For this reason, as shown in FIG. 7, part of the light beam emitted from the semiconductor light-emitting element (LD chip) 32 is reflected by, for instance, the inner surface of the cover glass 34, is reflected again by the bottom surface of the holder 31, is transmitted through the cover glass 34 as shown by the broken lines, and is emitted. This light beam is apparently similar to the light beam emitted from a position remote from the focal position. If such a light beam enters the lens 3, the light beam is deflected in the directions shown by the broken lines in FIG. 7. Then, the light beam becomes divergent light in which, as the light beam moves away from the lens 3, the light beam once concentrates the main light beam and then proceeds in a dispersive direction.

Here, a laser light-emitting device disclosed in Unexamined Japanese Patent Publication 8-5744/(1996) has a reflection preventing means which is provided only on the surface of the stay for holding the LD chip, but this reflection preventing means prevents reflection of incident light from other than the LD chip. According to this method, since the inner peripheral surface and the bottom surface of the holder are not provided with any coating, the light formed by part of the light beam which was emitted from the LD chip and reached the inner peripheral surface and the bottom surface of the holder becomes similar to the one described above.

In a short distance, the divergent light beam such as the one shown by the broken lines in FIGS. 7 and 9 is also radiated to an object located outside the substantially parallel light beam emitted from the lens shown by the solid lines in FIGS. 7 and 9. In an optical radar apparatus for a vehicle, in particular, in a case where this light beam radiated to the outside is large in intensity and is reflected by an object having a large reflectivity, strong reflected light is made incident upon a light-receiving element 8 via a light-receiving mirror 6 and a light-receiving lens 7 which will be described later.

Accordingly, this strong reflected light caused by the light beam reflected to the outside exceeds the threshold of the light-receiving sensitivity of the light-receiving element 8 (which will be described later), so that an erroneous detection is made that the object is present in the forward direction shown by the dotted-dash line in FIG. 1 (which will be described later). Thus, there is a problem in that, in a short distance, such a light beam which is radiated in a slightly dispersed manner in the vicinity of the light beam is also detected when it is reflected by a large reflecting plate or the like installed at the shoulder of a road or the like having a large reflectivity and a large area, thereby making it impossible to detect an actual object to be detected.

SUMMARY OF THE INVENTION

The present invention has been devised to overcome the above-described problem, and it is an object of the present invention to prevent the light beam from the light-emitting element from becoming dispersed in its vicinity as it proceeds farther from the light-transmitting portion after it is formed into a predetermined beam shape by a lens, and to make it possible to reliably detect an actual object to be detected particularly in a radar apparatus for a vehicle or the like.

In accordance with the present invention, the optical radar apparatus is characterized by comprising: a light-emitting device for emitting light; and light-transmitting means including a mirror for reflecting and transmitting the emitted light and a supporting member for supporting the mirror, wherein a portion of a reflecting surface of the mirror is fixed to the supporting member so as to eliminate dispersion of the light due to distortion of the reflecting surface of the mirror of the light-transmitting means.

In particular, an indent (drawn portion) is provided in a portion of a mirror attaching portion of a plate so as to prevent the deflection of the attaching portion of the plate which is the supporting member for attaching and fixing the mirror for reflecting the light beam and changing its direction.

In addition, the mirror is fixed to the supporting member at a plurality of locations, so as to produce a slight clearance between the supporting member and the mirror. Namely, the mirror is point bonded at a plurality of points by means of, for instance, an adhesive agent or the like to ensure that the deflection of the plate will not affect the reflecting surface of the mirror after the attachment even in a case where deflection has occurred in the mirror attachment surface of the plate which is the supporting member.

In addition, means for suppressing the reflection of light is provided by coloring the inner surfaces of the light-emitting device (a stay and an inner peripheral surface and a bottom surface of a holder of a laser diode) in black, for instance, or by coloring the same in a color for absorbing the light, or by attaching woolen cloth or the like thereto, so as to eliminate internal reflection in the interior of the light-emitting device (in the interior of the holder).

DETAILED DESCRIPTION OF THE PREFERRED EMBODIMENTS

First Embodiment

Figure 1:
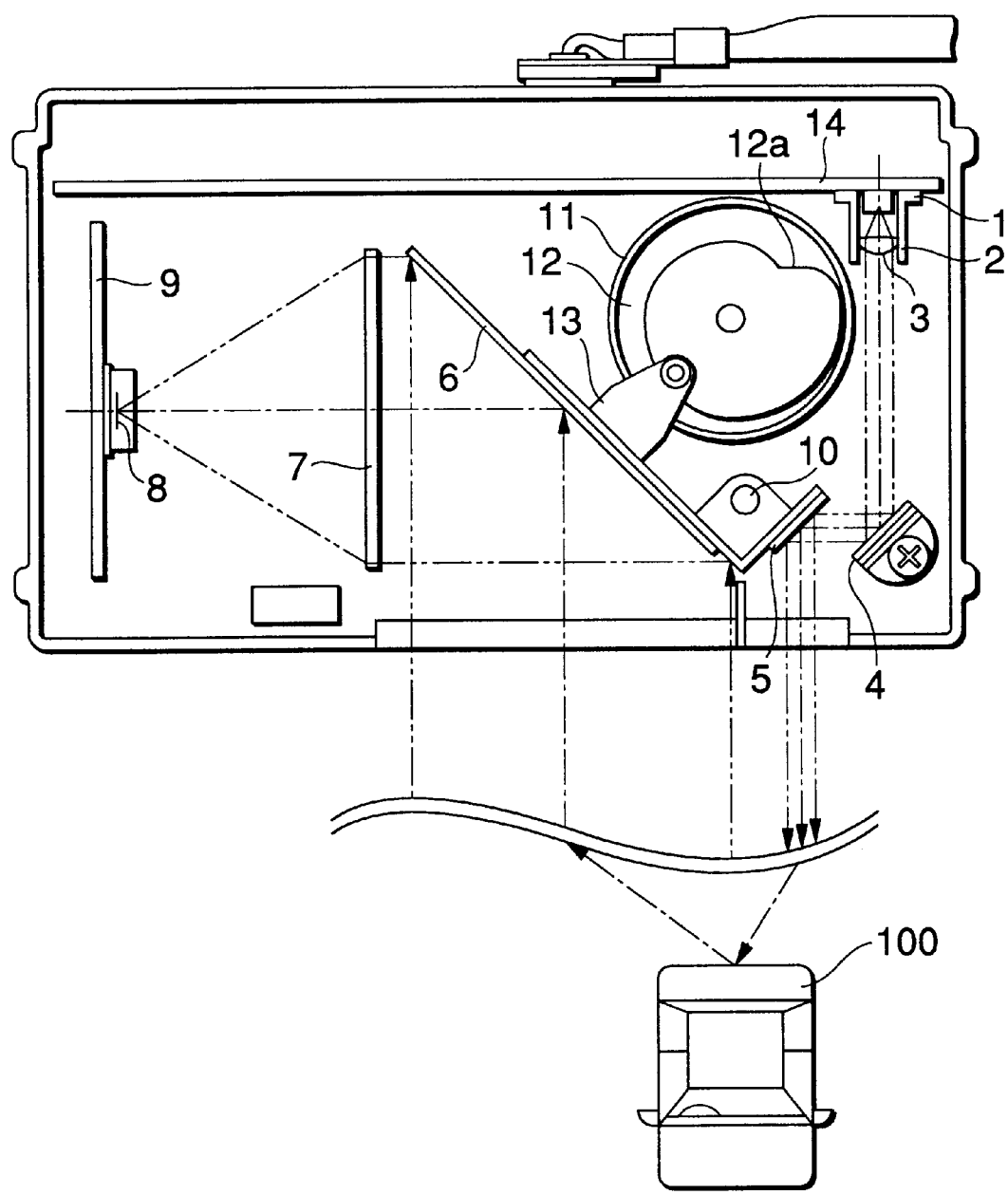
FIG. 1 is an overall schematic diagram illustrating an optical radar apparatus for a vehicle to which an embodiment of the present invention is applied.
Figure 2:
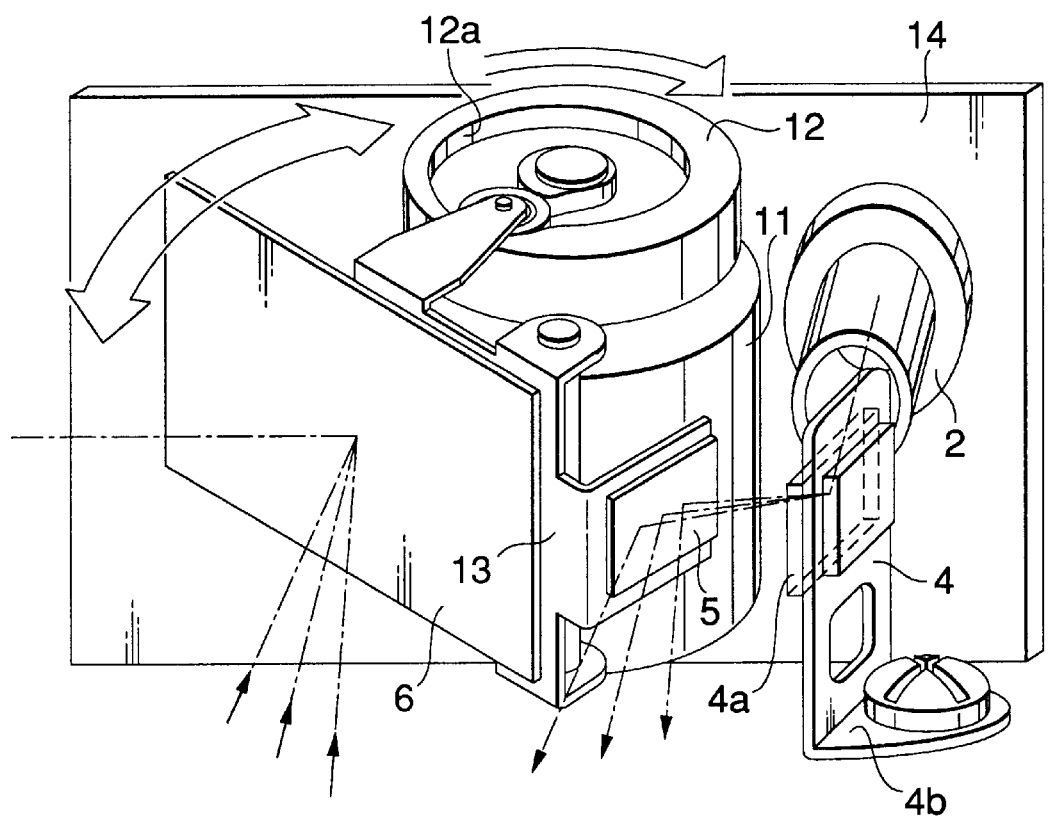
FIG. 2 is a perspective view illustrating the optical radar apparatus for a vehicle to which the embodiment of the present invention is applied.

At first, referring to FIGS. 1 and 2, a description will be given of the overall configuration and operation of an optical radar apparatus for a vehicle to which a first embodiment of the present invention is applied. FIG. 1 is an overall schematic diagram illustrating an optical radar apparatus for a vehicle of a beam-scanning system, and FIG. 2 is a perspective view of the optical radar apparatus.

In the drawings, reference numeral 14 denotes a main board on which control electronic elements constituting the optical radar apparatus for a vehicle have been assembled. A light-emitting device 1 for emitting a laser beam is disposed on the main board 14. Further, a lens holder 2 for holding the components of the light transmission system such as the light-emitting device 1 and a lens 3 is attached to the main board 14, and the lens 3 performs the function of adjusting the laser light from the light-emitting device 1 to a predetermined broadening angle.

A fixed-mirror assembly 4 performs the function of reflecting the light beam from the lens 3 and changing its direction, and is comprised of a mirror 4a and a supporting member 4b. A light-transmitting mirror 5 performs the function of further reflecting the light beam reflected by the mirror 4a so as to change its direction, thereby radiating the light beam in the forward direction. A light-receiving mirror 6 performs the function of changing the direction of the reflected light formed by the light beam which was reflected upon striking an object 100 to be detected in the front, while a light-receiving lens 7 focuses the reflected light from the light-receiving mirror 6. A light-receiving element 8 converts the reflected light focused by the light-receiving lens 7 to a light-reception signal, and a light-receiving board 9 has the light-receiving element 8 mounted thereon, and calculates the distance to the object 100 by processing the reception signal of the light-receiving element 8.

Both the light-transmitting mirror 5 and the light-receiving mirror 6 are fixed to a tilting member 13, and are arranged to be tilted about a tiltably supporting point 10. A pulse motor 11 is used to tilt the tilting member 13 with the light-transmitting mirror 5 and the light-receiving mirror 6 fixed thereto. A cam 12 is fixed to a rotating output shaft of the pulse motor 11, and the tilting member 13 is adapted to tilt about the tiltably supporting point 10 along a groove of the cam 12 shaped in the form of a curve 12a.

Next, a description will be given of the operation of the above-described optical radar apparatus for a vehicle. The light-emitting device 1 emits a light beam on the basis of a light transmission signal from a control circuit mounted on the main board 14. The flux of the emitted light beam is condensed to a predetermined range by the lens 3. The light beam condensed by the lens 3 is reflected by the fixed mirror 4 and the light-transmitting mirror 5, respectively, its direction is thereby changed consecutively, and the light beam is radiated, for example, in the direction of the dotted-dash line in FIG. 1 and in the forward direction of the vehicle. The light beam radiated in the forward direction of the vehicle strikes the object 100, and the reflected light beam returns again toward the vehicle from the direction of the dotted-dash line. This reflected light is reflected by the light-receiving mirror 6, and the reflected light with its direction thus changed is made incident upon the light-receiving lens 7, is focused by the light-receiving lens 7, and reaches the light-receiving element 8. Then, the light-receiving element 8 receives the focused reflected light and obtains a reception signal. The distance to the object 100 is calculated on the basis of the relationship of the transmission and reception signals in the above-described process, i.e., on the basis of propagation delay time from the time the light is generated by the light-emitting source until the reflected light is received by the light-receiving means.

Meanwhile, when the pulse motor 11 rotates, and the cam 12 fixed to its output shaft is rotated, the tilting member 13 effects tilting motion about the tiltably supporting point 10 along the groove formed by the cam curve 12a. The motion of the tilting member 13 is transmitted to the light-transmitting mirror 5 and the light-receiving mirror 6 which are formed as a unit, and the light-transmitting mirror 5 and the light-receiving mirror 6 undergo tilting motion about the tiltably supporting point 10. The light beam reflected by the light-transmitting mirror 5 is radiated by effecting scanning in such a manner as to undergo one reciprocation in the direction between the two-dotted dash lines in FIG. 1 with respect to one rotation of the cam 12. At this time, the reflected light which struck the object 100 located in the direction of illumination with the mirror 5 also returns to the vehicle side from the direction between the two-dotted dash lines in FIG. 1.

As the light-receiving mirror 6 undergoes tilting motion, the above-described reflected light is arranged to pass through the light-receiving lens 7 as reflected light substantially orthogonal to the plane of the light-receiving lens 7, and the reflected light from the object 100 is always focused efficiently substantially at the focal position of the light-receiving lens 7, making it possible to obtain a reception signal at the light-receiving element 8. Thus, it is possible to ascertain the distance between the vehicle and the object 100 in the front as well as the direction of the object.

Figure 3A:
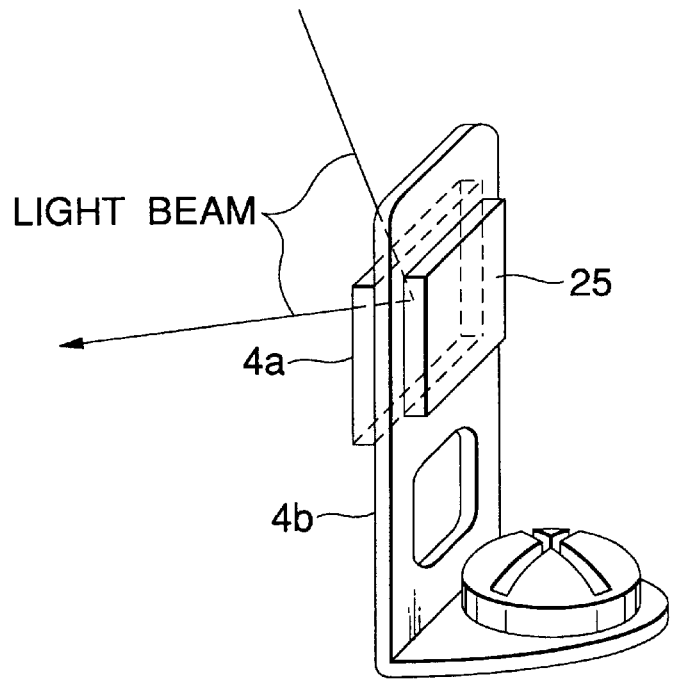
FIGS. 3A and 3B are a perspective view and a partial cross-sectional view of a fixed mirror used in the optical radar apparatus in accordance with a first embodiment of the present invention.
Figure 3B:
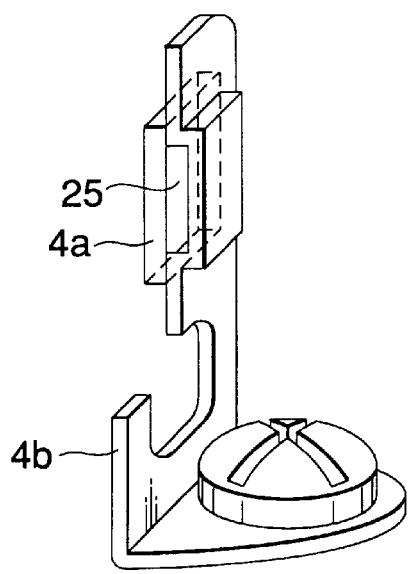
Figure 4A:
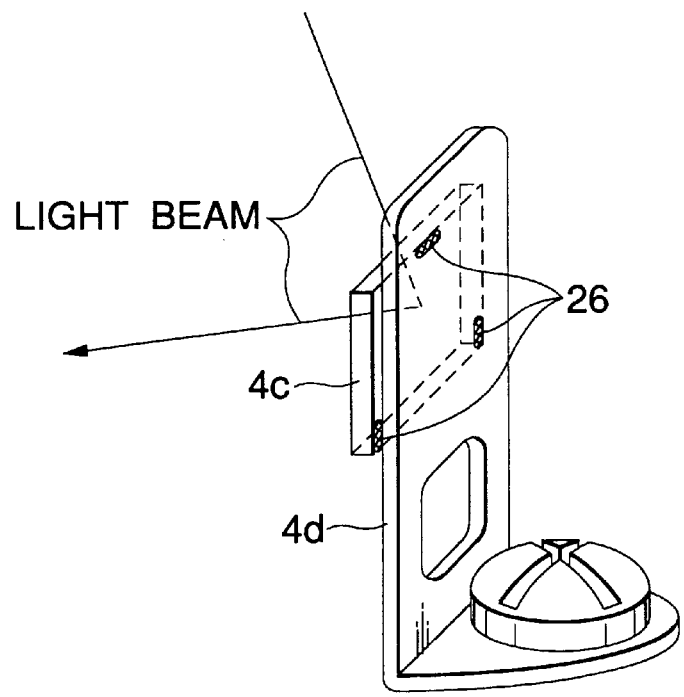
FIGS. 4A and 4B are a perspective view and a front elevational view, respectively, illustrating the fixed mirror used in the optical radar apparatus in accordance with a second embodiment of the present invention.
Figure 4B:
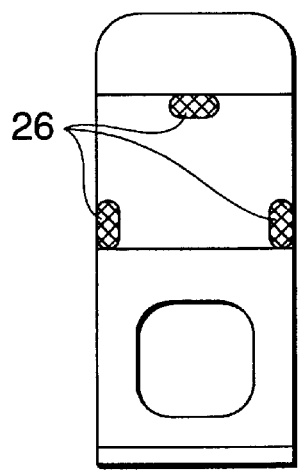
Figure 5A:
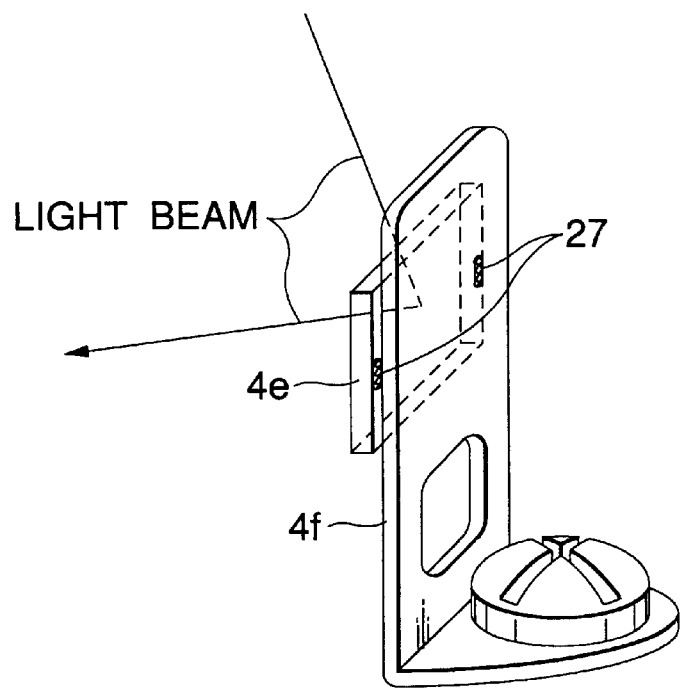
FIGS. 5A and 5B are a perspective view and a front elevational view, respectively, illustrating the fixed mirror used in the optical radar apparatus in accordance with the second embodiment of the present invention.
Figure 5B:
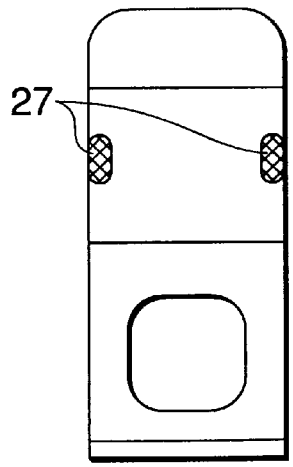

FIG. 3a is a perspective view of the fixed mirror 4 applied to the optical radar apparatus in accordance with the first embodiment, and FIG. 3b is a diagram illustrating a partial cross section of its central portion. The fixed mirror 4 in accordance with the first embodiment is comprised of the mirror 4a for reflecting the light beam from the light-emitting device 1 to change its direction as well as its supporting member 4b. The supporting member 4b has a shape in which a plate member is bent into an L-shape, and a depression (recessed portion) 25 is provided in a central portion of the L-shaped mirror-attaching surface.

In the first embodiment, by the provision of the depression (recessed portion) 25 in the plate-shape supporting member 4b, deflection does not occur in the plate, and its surface for attaching the mirror 4a becomes planar. In addition, the attaching surface on the mirror side is not an overall surface but a peripheral surface, so that if the mirror 4a is fixedly attached by an adhesive agent or the like, the reflecting surface of the mirror 4a is not deflected and becomes planar.

Figure 9:
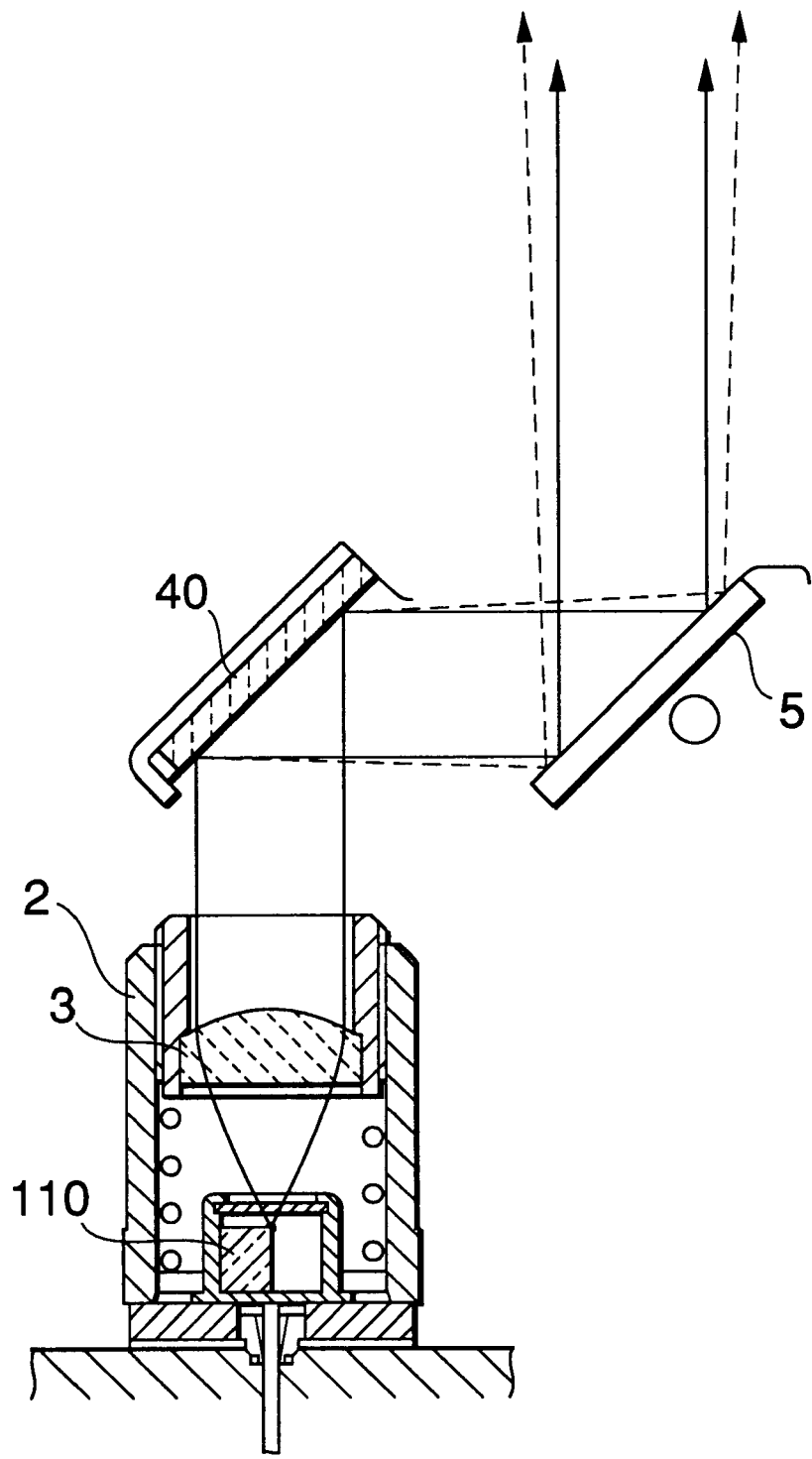
FIG. 9 is a cross-sectional plan view illustrating the positional relationship of a light-transmitting portion of the optical radar apparatus.

For this reason, the light beam emitted from the light-emitting device 1 and formed into a predetermined beam shape by means of the lens 3 is reflected by the mirror 4a having the flat reflecting surface, and is radiated under control straightly in the direction shown by the solid lines in FIG. 9. Consequently, the light beam which proceeds in a dispersed manner in its vicinity as it proceeds farther from the light-transmitting portion becomes very weak, and in the radar apparatus for a vehicle it is possible to suppress to a low level the reflected light from a large reflecting plate or the like installed at the shoulder of a road or the like having a large reflectivity and a large area, and the large reflecting plate or the like which is off the main beam is not detected, thereby making it possible to detect an actual object to be detected on a stable basis.

Second Embodiment

FIGS. 4a and 4b and FIGS. 5a and 5b are perspective views and front elevational views, respectively illustrating fixed mirrors used in the optical radar apparatus in accordance with a second embodiment of the present invention. The fixed mirror assemblies 4 are each comprised of a mirror 4c or 4e and a supporting member 4d or 4f, and perform the function of reflecting the light beam from the light-emitting device 1 and for changing its direction. Then, each of the supporting members 4d and 4f has a shape in which a plate member is bent into an L-shape, and is not attached to the overall surface of the supporting member serving as the means for fixing the mirror 4c or 4e, but the mirror is point bonded at 26 or 27 by an adhesive agent or the like at three points (FIG. 4) or two points (FIG. 5) so that a slight clearance is formed between the mirror 4c or 4e and the supporting member (plate) 4d or 4f.

As a result, even if deflection has occurred at the attaching surface of the supporting member (plate), since there is a slight clearance between the supporting plate 4d or 4f and the mirror 4c or 4e, the deflection of the plate does not affect the reflecting surface of the mirror, the reflecting surface of the mirror 27 is not deflected and becomes planar.

A description will be given of the operation of the light transmission system of the optical radar apparatus in the second embodiment. In FIG. 9, the flux of the light beam from the light-emitting device 1 on the basis of the light transmission signal is reflected by the fixed mirror to change its direction, is reflected by the light-transmitting mirror 5 to change its direction again, and is radiated in the forward direction. Since there is no deflection in the reflecting surface of the reflecting mirror, the light beam is radiated in the forward direction as the substantially light beam without becoming dispersed. Accordingly, only the reflected light from the object located in the direction of the main beam shown by the solid lines in FIG. 9 is received by the light-receiving element 8 of the optical radar apparatus for a vehicle, so that the direction of the object can be detected accurately.

Third Embodiment

Figure 6:
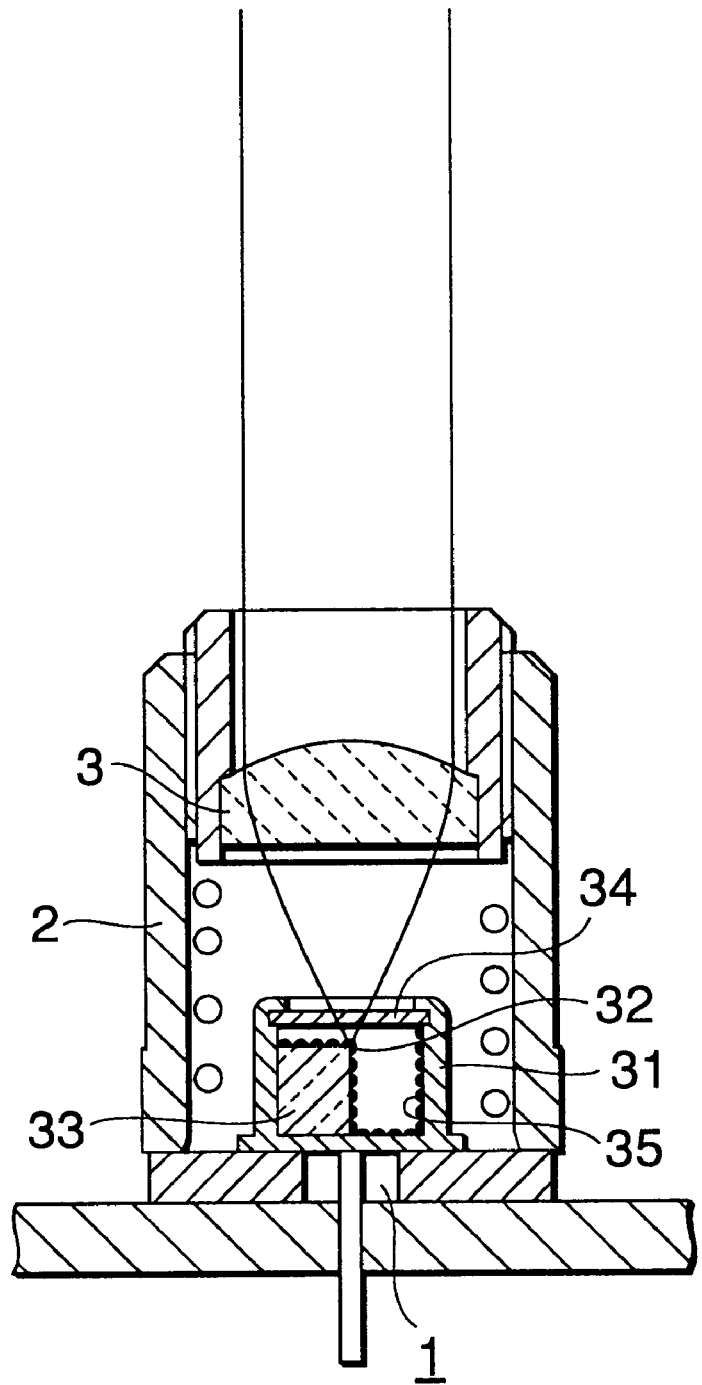
FIG. 6 is a cross-sectional view illustrating a light-emitting device used in the optical radar apparatus in accordance with a third embodiment of the present invention.

FIG. 6 is a cross-sectional view illustrating a light-emitting device used in the optical radar apparatus in accordance with a third embodiment of the present invention.

In FIG. 6, in the light-emitting device 1, a semiconductor light-emitting element (LD chip) 32 and a base (stay) 33 for holding the semiconductor light-emitting element 32 are accommodated in a holder 31. A cover glass 34 for sealing the interior of the holder 31 is provided at the front surface, as viewed in the light-emitting direction, of the semiconductor light-emitting element 32.

Figure 7:
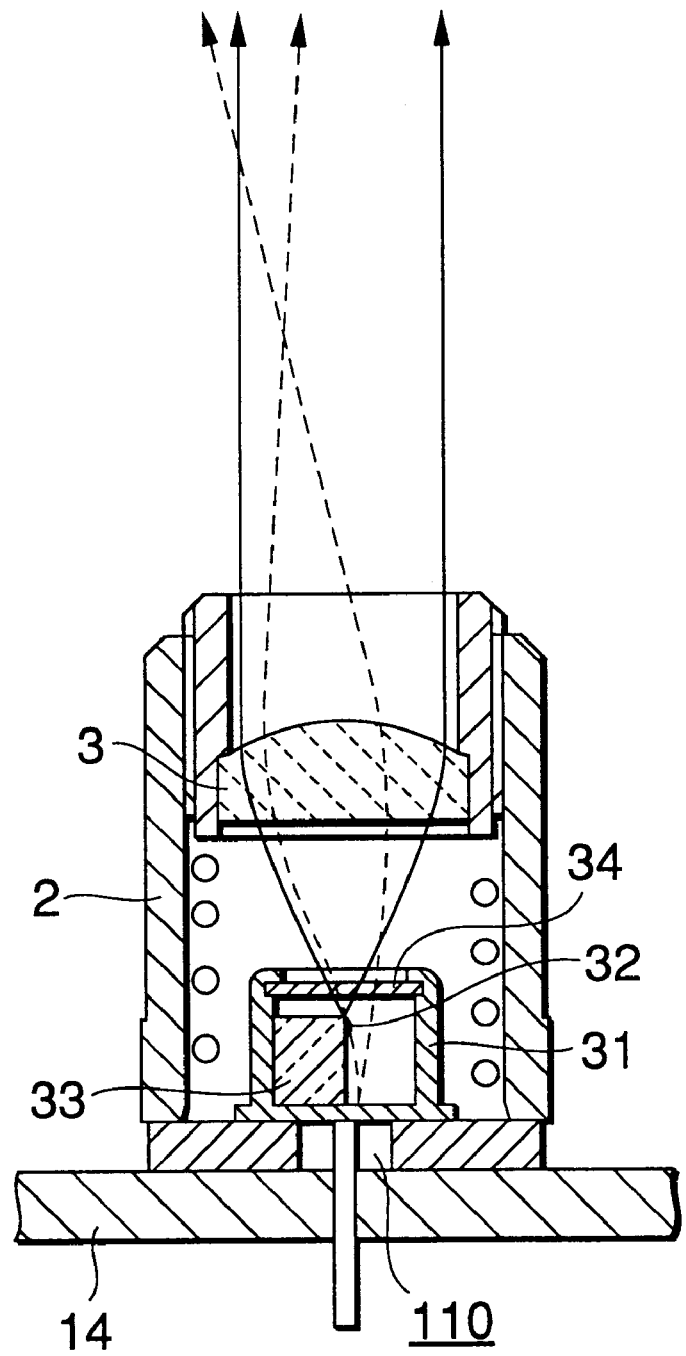
FIG. 7 is a cross-sectional view illustrating a light-emitting device used in a conventional optical radar apparatus.
Figure 8:
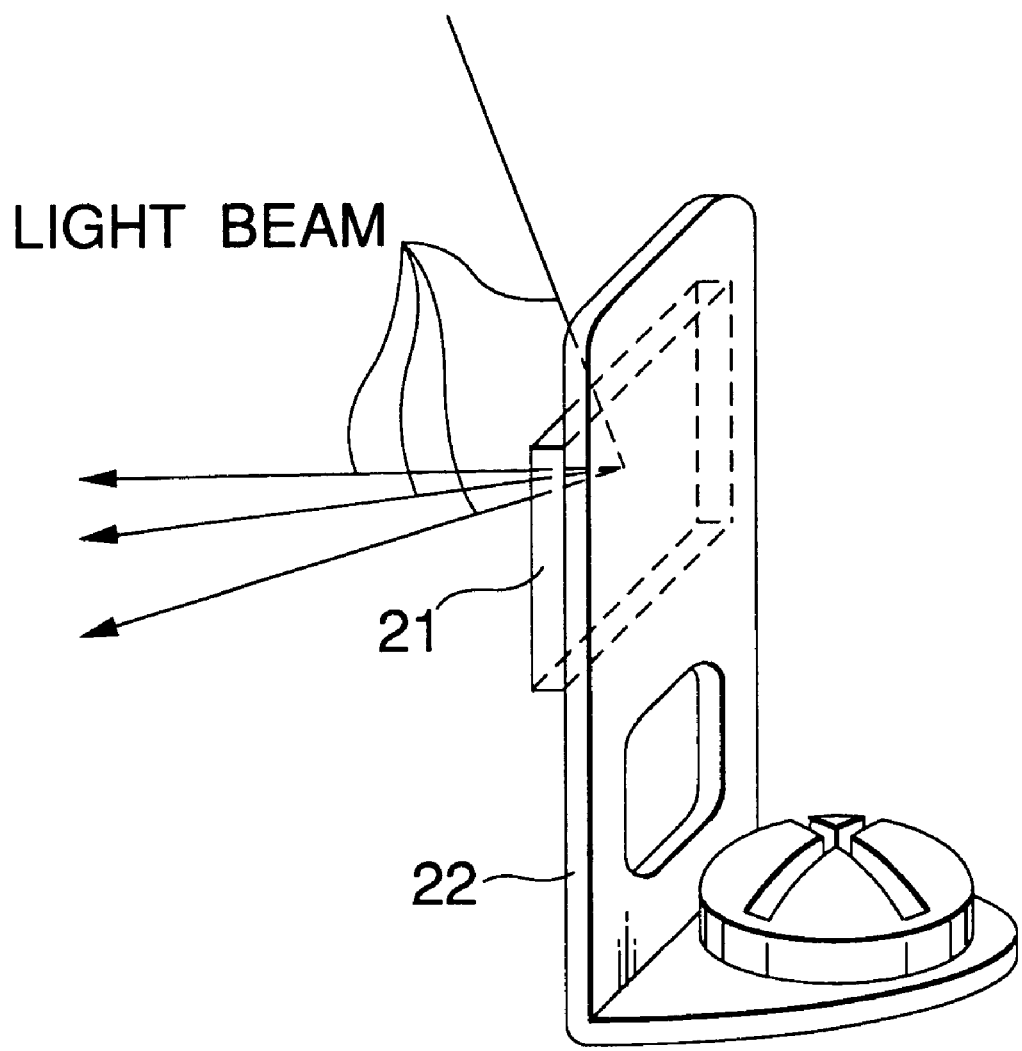
FIG. 8 is a perspective view of a fixed mirror used in a conventional optical radar apparatus for performing the function of reflecting a light beam and changing its direction.

In this third embodiment, woolen cloth 35 or the like is attached to the inner peripheral surface and the bottom surface of the holder 31 and the surface of the stay 33 in the light-emitting device 1. As a result, even if part of the light beam emitted from the semiconductor light-emitting element 32 as shown by the broken lines in FIG. 6, or the light reflected by the inner surface of the cover glass 34, reaches the inner surface and the bottom surface in the interior of the light-emitting device 1, since the woolen cloth 35 or the like is attached, the light beam is not reflected. Accordingly, the light beam radiated in the directions shown by the broken lines in FIG. 7 is eliminated, and the light beam from the lens 3 becomes a substantially parallel light beam, making it possible to obtain only the main beam shown by the solid lines in FIG. 6.

Accordingly, in the optical radar apparatus for a vehicle, only the reflected light from the object 100 located in the direction of the main beam is received by the light-receiving element 8 of the optical radar apparatus for a vehicle, so that the direction of the object can be detected accurately.

It should be noted that, as the means for preventing reflection, the inner peripheral surface and the bottom surface of the holder 31 and the surface of the stay 33 may be coated, for example, in black or in a color for absorbing light instead of attaching the woolen cloth thereto.

As described above, in accordance with the optical radar apparatus of the present invention, it is possible to prevent the light beam from the light-emitting device from becoming dispersed in its vicinity as it proceeds farther from the light-transmitting portion.

Specifically, by the provision of the indent (drawn portion) in a portion of the mirror attaching surface of the plate which is the supporting member, deflection does not occur in the attaching portion of the plate, and the mirror attaching surface becomes planar, with the result that the distortion of the reflecting surface of the mirror after the attachment of the mirror is eliminated.

In addition, since the mirror is point bonded at a plurality of points by means of an adhesive agent or the like, the deflection of the plate does not affect the distortion of the reflecting surface of the mirror after the attachment.

In addition, by coloring the inner peripheral surface and the bottom surface of the light-emitting device in black, for instance, or by attaching woolen cloth or the like thereto, the light beam due to the reflection from the inner surfaces of the light-emitting device can be eliminated, and the light emitted from the light-emitting element becomes only the main beam which becomes a parallel light beam after transmission through the lens.

In particular, if the optical radar apparatus of the present invention is used as an optical radar apparatus for a vehicle, at the time when the light beam from the light-emitting element is formed into a predetermined beam shape by means of a lens, the light beam which proceeds in a dispersed manner in its vicinity as it proceeds farther from the lens becomes very weak, and it is possible to suppress to a low level the reflected light from a large reflecting plate or the like installed at the shoulder of a road or the like having a large reflectivity and a large area, and the large reflecting plate or the like which is off the main beam is not detected, thereby making it possible to detect an actual object to be detected on a stable basis.

What is claimed is:

1. An optical radar apparatus comprising:
    a light-emitting device for emitting light; and
    light-transmitting means including a mirror for reflecting and transmitting the emitted light and a supporting member for supporting said mirror,
    wherein said light-transmitting means includes dispersion elimination means for eliminating dispersion of the light due to distortion of the reflecting surface of said mirror;
    wherein said mirror is attached to said supporting member and said dispersion elimination means comprises a recess in a portion of a mirror attaching surface of said supporting member.

2. An optical radar apparatus as claimed in claim 1 further comprising:
    light-receiving means for receiving reflected light obtained as the light is reflected by an object to be detected; and
    distance calculating means for calculating a distance to the object on the basis of a propagation delay time from the time the light is emitted from said light-emitting device until the reflected light is received by said light-receiving means.

3. An optical radar apparatus as claimed in claim 1, wherein, in said light-transmitting means, said mirror is fixed to said supporting member at a plurality of points so as to produce a slight clearance between said supporting member and said mirror.

4. An optical radar apparatus as claimed in claim 2, wherein, in said light-transmitting means, said mirror is fixed to said supporting member at a plurality of points so as to produce a slight clearance between said supporting member and said mirror.

5. An optical radar apparatus comprising:
    a light-emitting device in which a light-emitting element for emitting light is accommodated in its interior; and
    light absorbing means for absorbing internal reflection at an inner peripheral surface and a bottom surface of said light-emitting device;
    wherein said light absorbing means comprises a woolen cloth provided at an inner peripheral surface and a bottom surface of said light-emitting device.

6. An optical radar apparatus as claimed in claim 5 further comprising:
    light-transmitting means for reflecting and transmitting the emitted light;
    light-receiving means for receiving reflected light obtained as the light is reflected by an object to be detected; and
    distance calculating means for calculating a distance to the object on the basis of a propagation delay time from the time the light is emitted from said light-emitting device until the reflected light is received by said light-receiving means.

7. An optical radar apparatus as claimed in claim 5 wherein said light absorbing means comprises a coating provided at an inner peripheral surface and a bottom surface of said light-emitting device.

8. An optical radar apparatus as claimed in claim 6 wherein said light absorbing means comprises a coating provided at an inner peripheral surface and a bottom surface of said light-emitting device.

9. An optical radar apparatus comprising:
    a light-emitting device for emitting light;
    a fixed mirror assembly including a mirror and a supporting member, said fixed mirror assembly configured to change a direction of the light from said light-emitting device, and said mirror being fixedly attached to a mirror attaching surface of said supporting member;
    wherein said supporting member has a recessed portion such that a deflection does not occur in said supporting member and said mirror attaching surface is planar;
    a light-transmitting mirror which further reflects the light reflected by said mirror of said fixed mirror assembly to strike an object;
    a light-receiving mirror which changes a direction of the light reflected from said object;
    a light-receiving lens which focuses the light reflected from said light-receiving mirror;
    a light-receiving element which converts the focused light reflected from the light-receiving lens to a light-reception signal; and
    a light-receiving board having said light-receiving element mounted thereon and which calculates a distance to said object by processing said signal of said light-receiving element.

* * * * *